(12) United States Patent
Glad et al.

(10) Patent No.: US 12,204,715 B2
(45) Date of Patent: *Jan. 21, 2025

(54) INDUCTANCE COIL OF A CAPACITANCE MODULE

(71) Applicant: Cirque Corporation, Sandy, UT (US)

(72) Inventors: Paul Glad, Sandy, UT (US); Douglas Steck, Riverton, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,932

(22) Filed: Feb. 13, 2024

(65) Prior Publication Data

US 2024/0419277 A1    Dec. 19, 2024

Related U.S. Application Data

(63) Continuation of application No. 18/203,118, filed on May 30, 2023, now Pat. No. 11,989,362.

(51) Int. Cl.
*G06F 3/041*   (2006.01)
*H01F 17/04*   (2006.01)
*H01F 27/28*   (2006.01)

(52) U.S. Cl.
CPC .......... *G06F 3/0414* (2013.01); *H01F 17/04* (2013.01); *H01F 27/2885* (2013.01)

(58) Field of Classification Search
CPC ......... G06F 3/0414; G06F 3/041–0488; G06F 3/016; H01F 17/04; H01F 27/2885
See application file for complete search history.

(56) References Cited

U.S. PATENT DOCUMENTS

| | | | |
|---|---|---|---|
| 10,296,091 B2 | 5/2019 | Heubel | |
| 10,866,642 B2 | 12/2020 | Rosenberg | |
| 11,989,362 B1 * | 5/2024 | Glad | G06F 3/0414 |
| 2022/0011868 A1 * | 1/2022 | Junus | G06F 3/045 |

* cited by examiner

*Primary Examiner* — Temesghen Ghebretinsae
*Assistant Examiner* — Ivelisse Martinez Quiles

(57) ABSTRACT

A capacitance module may include at least one touch electrode on a first surface of the capacitance module; a first portion of an inductance coil deposited on a second surface of the capacitance module; and a second portion of the inductance coil deposited on a third surface of the capacitance module where the first portion of the inductance coil and the second portion of the inductance coil may be electrically connected and where the inductance coil may be positioned to interact with a magnet adjacent to the inductance coil.

17 Claims, 19 Drawing Sheets

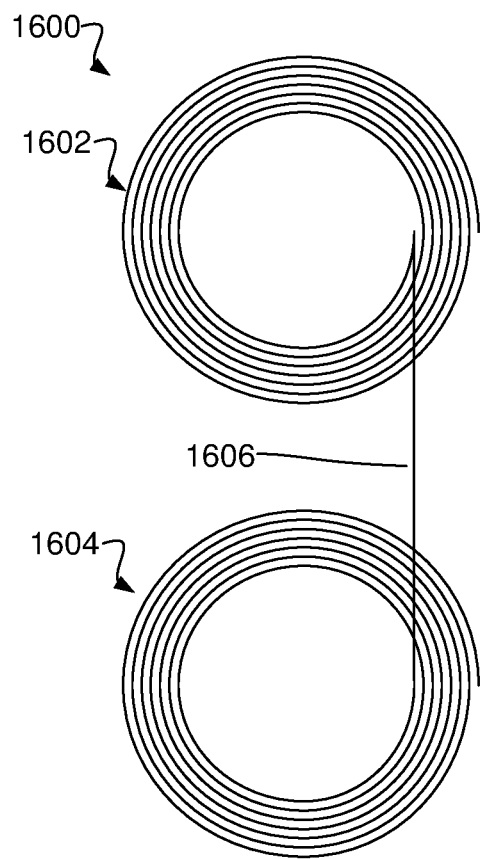 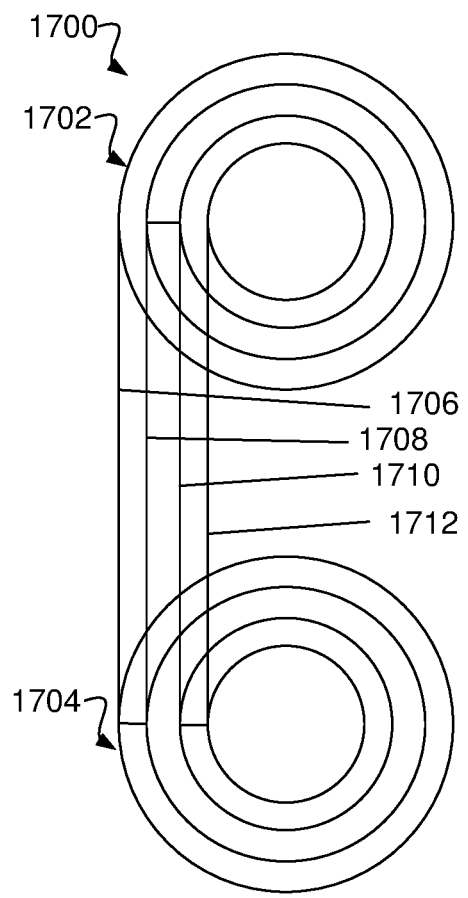
*Fig. 16*   *Fig. 17*

1900

Apply a signal to an inductance coil formed on multiple substrate layers of a capacitance module, where at least one substrate of the capacitance module includes a via that electrically connects a first portion of the inductance coil with a second portion of the inductance coil, such that the signal causes the inductance coil interact with a magnet positioned adjacent at least one of the substrates in a way that causes the capacitance module to vibrate — 1902

*Fig. 19*

INDUCTANCE COIL OF A CAPACITANCE MODULE

RELATED APPLICATIONS

The present Application is a continuation of U.S. patent Ser. No. 18/203,118 to Paul Glad, et al., filed on May 30, 2023, and titled "Inductance Coil of a Capacitance Module." U.S. patent Ser. No. 18/203,118 is expressly incorporated by reference herein.

FIELD OF THE DISCLOSURE

This disclosure relates generally to systems and methods for measuring a pressure input and/or providing a haptic response. In particular, this disclosure relates to systems and methods for measuring a pressure input or providing a haptic response on a touch surface of an electronic device with an inductive coil.

BACKGROUND

A touch pad is often incorporated into electronic devices to provide a mechanism for giving inputs to the device. The touch pads may operate using capacitance sensing and/or pressure sensing, which may directly manipulate objects depicted in the screen. Pressure sensors may detect pressure from on the touch pad intended by the user to be control inputs.

An example of a pressure sensor is disclosed in U.S. Pat. No. 10,296,091 issued to Robert W. Heubel, et al. This reference discloses a method of generating haptic effects includes detecting an input of pressure applied to a device using a gesture and determining a level associated with the gesture based on the pressure input, as well as determining a selection of an item at the level based on the gesture and a context associated with the item at the level, along with generating a contextual haptic effect comprising haptic parameter based on the context of the item at the level.

An inductive method for measuring pressure inputs and providing haptic feedback may be incorporated into a touch pad system.

An example of inductive pressure sensing and haptics is disclosed in U.S. Pat. No. 10,866,642 B2 issued to Ilya D. Rosenberg, et al. This reference discloses a system for detecting and responding to touch inputs with haptic feedback includes: a magnetic element rigidly coupled to a chassis; a substrate; a touch sensor interposed between the substrate and a touch sensor surface; an inductor coupled to the substrate below the touch sensor surface and configured to magnetically couple to the magnetic element; a coupler coupling the substrate to the chassis, compliant within a vibration plane approximately parallel to the touch sensor surface, and locating the inductor approximately over the magnetic element; and a controller configured to intermittently polarize the inductor responsive to detection of a touch input on the touch sensor surface to oscillate the substrate in the vibration plane relative to the chassis. Each of these references are herein incorporated by reference for all that they disclose.

SUMMARY

In one embodiment, a capacitance module may include at least one touch electrode on a first surface of the capacitance module; a first portion of an inductance coil deposited on a second surface of the capacitance module; and a second portion of the inductance coil deposited on a third surface of the capacitance module where the first portion of the inductance coil and the second portion of the inductance coil may be electrically connected and where the inductance coil may be positioned to interact with a magnet adjacent to the inductance coil.

The magnet may be configured to provide a haptic effect on the capacitance module by moving the inductance coil with a change in the magnetic force.

The module may include a controller and memory where the memory includes programmed instructions that may be configured, when executed, to cause the controller to detect an applied force on the capacitance module by measuring a change in a distance between the inductance coil and the magnet.

The first surface may be on a first substrate; the second surface may be on a second substrate; the third surface may be also on the second substrate; and a shield may be located between the first surface and the second surface.

The module may include a controller and memory where the memory includes programmed instructions that may be configured, when executed, to cause the controller to impose a varying signal on the inductance coil that interacts with the magnet to provide a haptic effect on the capacitance module.

The module may include a shield where the shield may be located between the at least one touch electrode and both the first portion of the inductance coil and the second portion of the inductance coil.

The first portion of the inductance coil and the second portion of the inductance coil may be electrically connected at multiple places within the portions.

A third portion of the inductance coil may be deposited on a fourth surface of the capacitance module.

the first portion of the inductance coil may have a plurality of loops; the second portion of the inductance coil may have a plurality of loops; and each of the plurality of loops of the first portion of the inductance coil may be electrically connected to at least one of the plurality of loops of the second portion of the inductance coil.

The first portion of the inductance coil and the second portion of the inductance coil may be connected in series.

The first portion of the inductance coil and the second portion of the inductance coil are connected in parallel.

The inductance coil may be located near a corner of the second surface.

The inductance coil may be part of a group of inductance coils; the second surface has a plurality of corners; and at least one of the inductance coils from the group of inductance coils may be located near each of the corners of the second surface.

The module may include an oscillating enhancement mechanism connected to the capacitance module.

The oscillating enhancement mechanism may be foam.

The oscillating enhancement mechanism may be a spring.

A method for detecting a pressure input may include receiving an input from an inductance coil formed on multiple substrate layers of a capacitance module; determining that a user is applying pressure to the capacitance module based at least in part on the received input; wherein at least one substrate of the capacitance module includes a via that electrically connects a first portion of the inductance coil with a second portion of the inductance coil.

A method for providing a haptic response may include applying an electrical signal on an inductance coil in a capacitance module positioned to interact with a magnet adjacent to the inductance coil; continuing to apply the electrical signal on the inductance coil for a predetermined amount of time; stopping applying the electrical signal on the inductance coil.

A computer-program product for detecting a pressure input, the computer-program product may include a non-transitory computer-readable medium storing instructions executable by a processor to receive an input from an inductance coil formed on multiple substrate layers of a capacitance module; determine that a user is applying pressure to the capacitance module based at least in part on the received input; wherein at least one substrate of the capacitance module includes a via that electrically connects a first portion of the inductance coil with a second portion of the inductance coil.

A computer-program product for providing a haptic response, the computer-program product may include a non-transitory computer-readable medium storing instructions executable by a processor to apply an electrical signal on an inductance coil in a capacitance module positioned to interact with a magnet adjacent to the inductance coil; continue to apply the electrical signal on the inductance coil for a predetermined amount of time; stop applying the electrical signal on the inductance coil.

BRIEF DESCRIPTION OF THE DRAWINGS

FIG. 16 depicts an example of connections between portions of an inductance coil in accordance with the disclosure.

FIG. 17 depicts an example of connections between portions of an inductance coil in accordance with the disclosure.

FIG. 19 depicts an example of a method of providing a haptic response in accordance with the disclosure.

Figure 1:
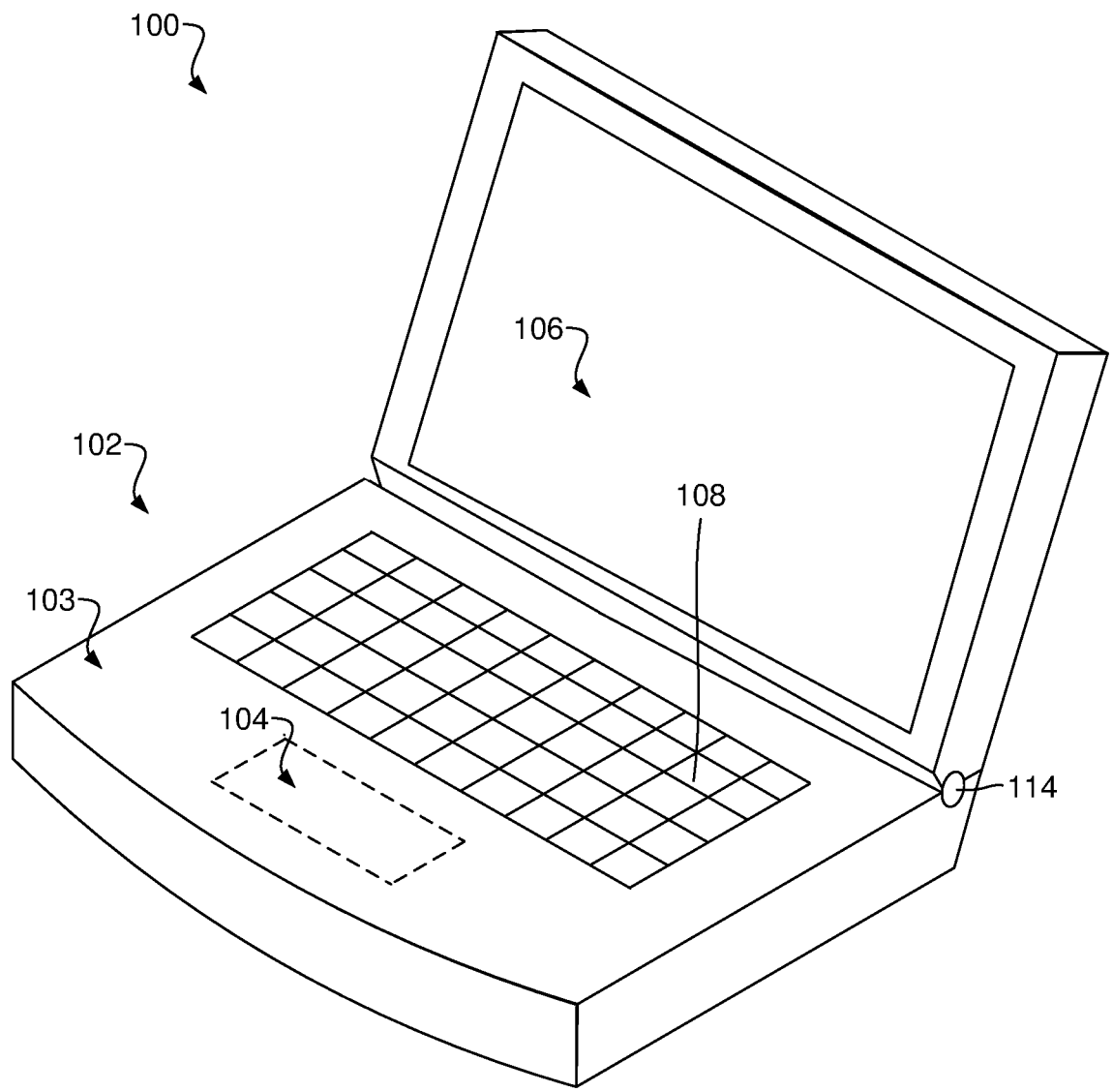
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "inductance coil" may generally refer to an electrical component that may produce a change in a magnetic field when receiving an electrical signal and/or may produce an electrical signal when receiving a change in a magnetic field. In some examples, an inductive coil may be a conductive material wound in a concentric manner. For example, a conductive trace and/or electrode on a substrate that forms a circular pattern may be an inductance coil. In some examples, a change in a magnetic field around the inductance coil may produce an electrical current in the inductance coil. In some examples, applying an electrical current to an inductance coil may change the magnetic field around the inductance coil. In some examples, the inductance coil may be deposited, formed, or otherwise attached to a surface of a layer of a conductive module.

For the purposes of this disclosure, the term "magnet" may generally be defined as a component which may produce a magnetic field. In some examples, a magnet may be a ferromagnetic object and have a permanent or semi-permanent magnetic field. In other examples, a magnet may have a non-permanent or electrically induced magnetic field. For example, an inductive material that may produce a magnetic field when an electrical current is applied to it may be a magnet. In some examples, a magnet may repel or attract other magnets. In some examples, magnets may produce an electrical current in an inductive material when moving adjacent to the material.

For the purposes of this disclosure, the term "haptic response" may generally refer to a force, vibration, motion, or combinations thereof within an electrical device that may be intended to communicate through the sense of touch. In some examples, a haptic response may be produced by an oscillating motion of an object. In some examples, an oscillating object may cause other objects around the object to oscillate or vibrate. In this example, the surface that the user may touch or feel may be caused to vibrate and this is an example of a haptic response.

For the purposes of this disclosure, the term "oscillating enhancement mechanism" may generally refer to a mechanism that may aid a system in preserving and/or enhancing energy in an oscillatory motion. In some examples, an oscillating enhancement mechanism may cause a system to have a resonant frequency for oscillation. In such an example, a system oscillating at a certain frequency with an oscillating enhancement mechanism may oscillate more efficiently than a system without an oscillating enhancement mechanism. For example, a spring attached to a mass may oscillate at a resonant frequency due to the natural properties of the spring. In this example, the spring is an oscillating enhancement mechanism. In some examples, driving a system with an oscillating enhancement mechanism at a certain resonant frequency may cause the oscillation to be amplified. In some examples, the oscillating enhancement mechanism may include a spring, a wave spring, a compression spring, a tension spring, an elastomeric material, another type of mechanism, another type of material, or combinations thereof.

For the purposes of this disclosure, the term "pressure input" may generally refer to a force applied to a surface by an object pressing on the surface at a certain measurable location with a certain measurable force. In some cases, the object may be a finger, a stylus, a palm of a hand or any other object capable of pressing against a surface. In some examples, the location of the pressure input may be a point, a series of points or an area corresponding to the area of the object. For example, a finger may press on a surface of a capacitance module at a certain location and a certain magnitude that may be measured by a pressure sensor. In some examples, multiple magnitudes at multiple locations may be measured as a single pressure input. In other examples, a pressure input may be one magnitude at one location.

For the purposes of this disclosure, the term "connected in series" may generally refer to components or portions of components being electrically connected so that electrical current passes through the portions or components one after another. For example, an inductance coil may have a first and a second portion in which a single connection connects the two portions. In such an example, applying an electrical current to the coil may cause the current to flow through the first portion, across the connection, and through the second portion. In some examples, multiple connections between portions may be used and the coil may still be connected in series.

For the purposes of this disclosure, the term "connected in parallel" may generally refer to components or portions of components being electrically connected so that electrical current passes through portions or components at the same time, or that current may be applied to the portions or components at multiple points of the portions or components. For example, an inductance coil may have a first portion and a second portion. In some examples, a part of the first portion may be connected to multiple parts of the second portion and current may flow from the first part of the first portion to multiple parts of the second portion. In some examples, any number of suitable connections may be used to connect parts of portions and/or portions in series. In some examples, a current may be applied at several points on either portion.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approaches the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
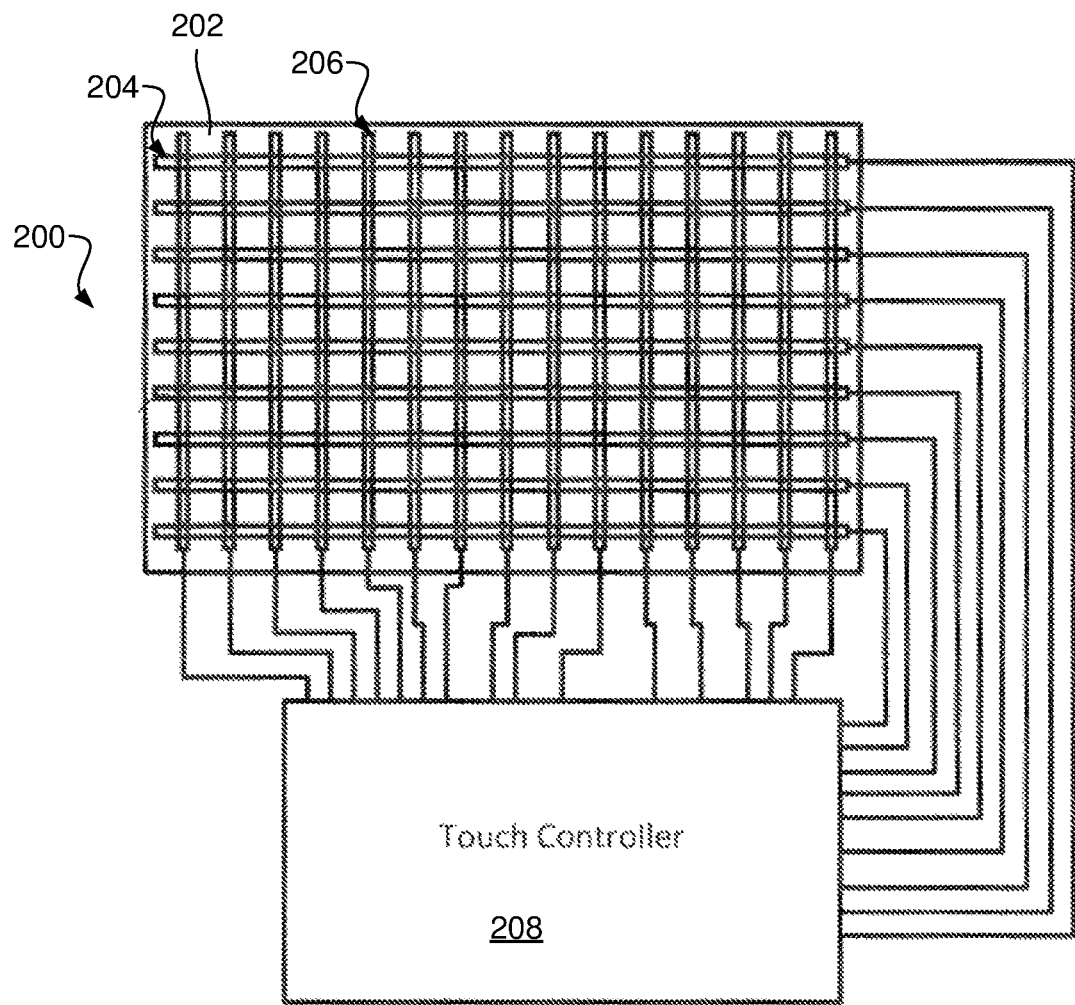
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
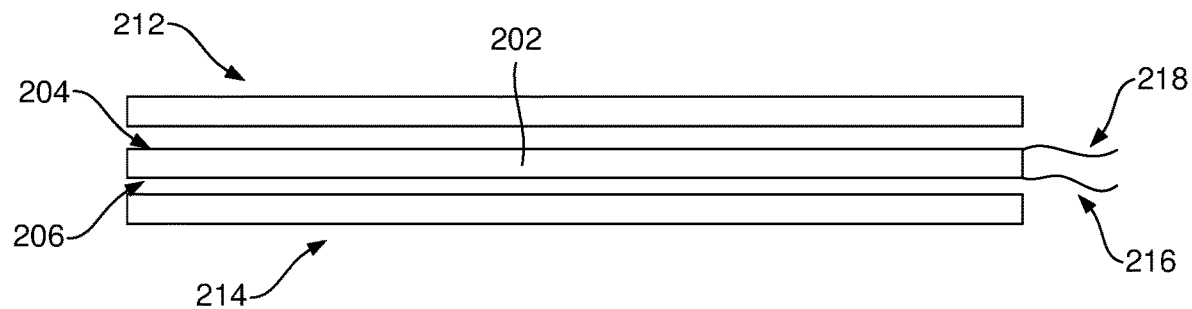
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approaches the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
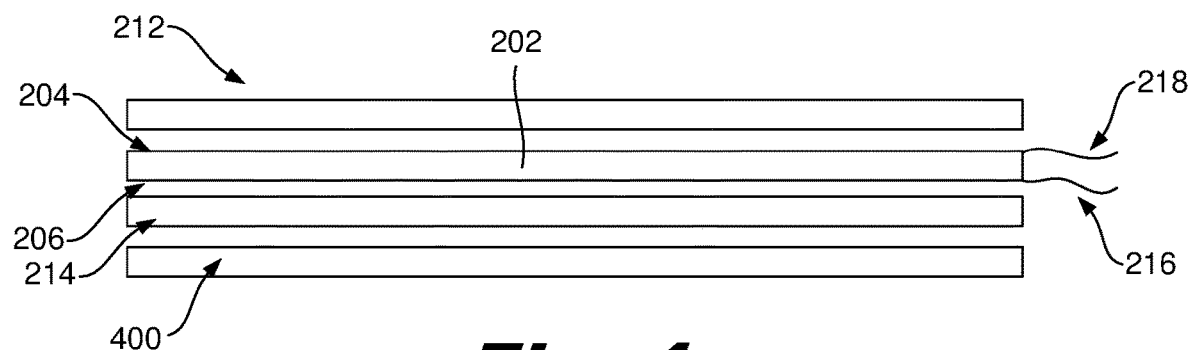
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
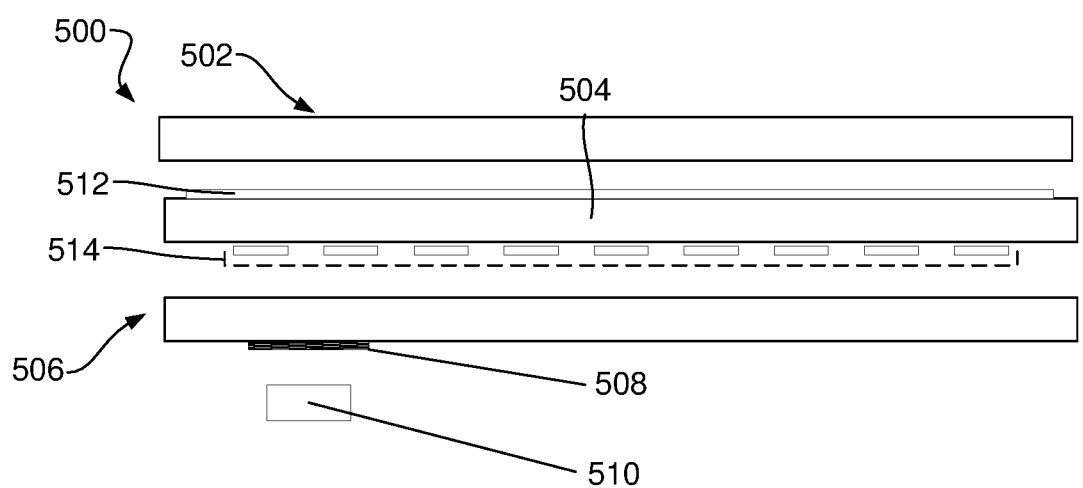
FIG. 5 depicts an example of a capacitance module and a magnet in accordance with the disclosure.

FIG. 5 depicts an example of a cross section of a capacitance module 500. A first substrate 504 may be located between a reference surface 502 and a second substrate 506. The first substrate 504 has a first side with a first set of electrodes 512 and a second set of electrodes 514. The second substrate 506 has a first side and a second side. An inductance coil is disposed on the second side of the second substrate. A magnet 510 is positioned adjacent to the inductance coil 508 and is aligned with the inductance coil 508. In some examples, the sets of electrodes 512 and 514 may be x and y capacitance electrodes respectively and may be used in a capacitance circuit to detect and/or measure changes in capacitance. In some examples, the inductance coil 508 and the magnet 510 may be positioned so that they may interact with each other.

In one embodiment, the inductance coil 508 and the magnet 510 may interact with each other to provide a haptic response. In some examples, this haptic response may be provided by changing the magnitude and/or direction of a magnetic field related to a component of the capacitance module 500. In such an example, the change in the magnitude and/or direction of a magnetic field related to a first component may interact with a magnetic field related to a second component which may cause a movement in a component of the capacitance module 500. In some examples, an electrical signal may be applied to the inductance coil 508 to change the magnitude and/or direction of a magnetic field related to the inductance coil. In such an example, the change in the magnetic field may cause the inductance coil 508 to move due to being repelled and/or attracted with a magnetic field related to the magnet 510. In other examples, the magnet 510 may be an electromagnet. In such an example, an electrical signal may be applied to the magnet 510, which may change the magnitude and/or direction of a magnetic field related to the magnet, which may cause the inductance coil 508 to move due to being repelled and/or attracted with the magnetic field related to the magnet 510.

In another embodiment, the inductance coil 508 and the magnet 510 may interact with each other to detect a pressure input affecting the capacitance module 500. In some examples, the pressure input may move the reference surface 502, which may move the capacitance module 500. In such an example, the inductance coil 508 may be moved in relation to the magnet 510. This may cause a change in the electrical properties of the inductance coil 508. In some examples, this change in the electrical properties of the inductance coil may include a change in the measured current of the inductance coil caused by a change in a magnetic field related to the inductance coil affected by the change in position of the magnet 510 in relation to the inductance coil 508. In some examples, the change in the measured current of the inductance coil 508 may be used to determine the pressure of a pressure input.

In some examples, the inductance coil 508 may be a trace, electrode, conductor, and/or a wire disposed on a two-dimensional surface of the substrate 506. In such an example, the coil material may be disposed on the substrate in a pattern or shape in which applying an electrical signal to the conductive material may cause a change in the magnetic field around the material. In some examples, the conductive material may be disposed in a concentric pattern. In some examples, applying an electrical signal to the conductive material may change the magnetic field in a direction perpendicular to the surface of the substrate 506 on which the conductive material is disposed. In some examples, the magnet 510 may be aligned with the center of the shape or pattern formed by the disposed conductive material. In some examples, the change in a magnetic field caused by the application of an electrical signal to the conductive material disposed on the substrate 506 may be aligned with the magnetic field of the magnet 510. In such an example, applying a first electrical signal may cause the aligned magnetic fields to have a magnitude in the same direction and applying a second electrical signal may cause the aligned magnetic fields to have a magnitude in an opposing direction. By oscillating between applying the first and second electrical signals, the aligned magnetic fields may oscillate between having the same direction and having an opposite direction, which may cause the inductance coil 508 and the magnet 510 to oscillate between repelling each other and attracting each other. In some examples, the magnet 510 may be fixed, and such an oscillation may cause a haptic response in the capacitance module 500.

In some examples, the coil material of the inductance coil 508 may be disposed on the substrate in a pattern or shape in which applying a change in the magnetic field around the conductive material may cause a measurable change in an electrical property of the conductive material. In those examples, a movement of the magnet 510 near the inductance coil 508 may cause a change in the measured current and/or voltage of the inductance coil. In such an example, movement of the capacitance module 500 may be determined by the change in the measured current and/or voltage of the inductance coil 508.

In some examples, a pressure applied to the reference surface 502 may cause the capacitance module 500 to move in relation to the magnet 510. In such an example, the magnetic field affecting the inductance coil 508 may change which may also cause the measured voltage and/or current in the inductance coil to change. This change in measured voltage and/or current may be used to determine that a pressure has been applied to the reference surface 502 of the capacitance module. In some examples, the change may also determine the magnitude, location, amount, size, or any other characteristic of the pressure applied to the reference surface 502.

In some examples, the first side of the substrate 506 may have a shield which may electrically isolate the sets of electrodes 512 and 514 from the inductance coil 508. While the example depicted in FIG. 5 has a capacitance module 500 with three substrates, a capacitance module may have any number of substrates. In the depicted example, the inductance coil is disposed on the surface of the substrate that is adjacent to the magnet 510. In other examples, the inductance coil may be disposed on a surface that is not adjacent to the magnet. In some examples, a substrate may be positioned between the inductance coil 508 and the magnet 510. In some examples, the inductance coil 508 may be disposed on a single side of a single substrate of the capacitance module 500. In other examples, the coil material of the inductance coil may be disposed on multiple sides of a substrate, multiple substrates, and/or multiple sides of multiple substrates. In those examples, inductance coils may have connections between different portions of the inductance coils that may connect portions of the coil through substrates, across substrates, around substrates, or along any other path within the capacitance module 500.

In the depicted example, the capacitance module 500 has a single inductance coil 508. In other examples, the capacitance module 500 may have multiple inductance coils. In such an example, each inductance coil may interact with a magnet positioned so that the inductance coil and the magnet may interact. In such an example, each magnet-coil pair may be used individually to provide haptic responses at certain locations on the reference surface 502. In some examples, multiple magnet-coil pairs may be used together to provide a larger haptic response and/or provide a haptic response at a certain location. In some examples, multiple magnet-coil pairs may be used to determine the magnitude and/or location of a pressure input applied to the reference surface 502 of the capacitance module 500. In such an example, measured current and/or voltage changes in the different magnet-coil pairs may be used, and the difference between the measured changes may determine the magnitude and/or location of the applied pressure.

Figure 6:
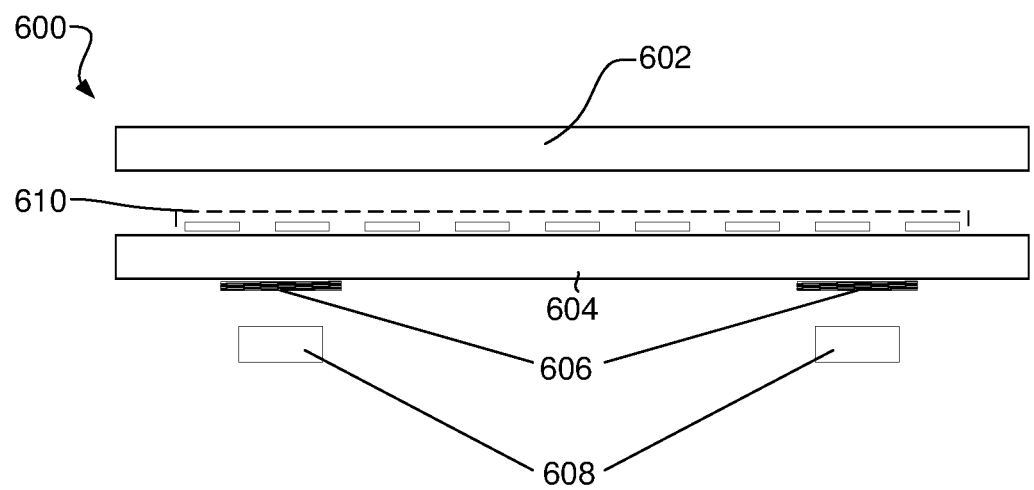
FIG. 6 depicts an example of a capacitance module with a set of magnets in accordance with the disclosure.

FIG. 6 depicts an example of a cross section of a capacitance module 600. A substrate 604 may be located adjacent to a reference surface 602. The substrate 604 has a first side with a set of electrodes 610 and a second side with a set of inductance coils 606. A set of magnets 608 is positioned adjacent to the set of inductance coils 606 and is aligned with the set of inductance coils 606. In some examples, the set of electrodes 610 may be self-capacitance electrodes and may be used in a capacitance circuit. In some examples, the set of inductance coils 606 and the set of magnets 608 may be positioned so that they may interact with each other but may not interact with the set of electrodes 610.

Figure 7:
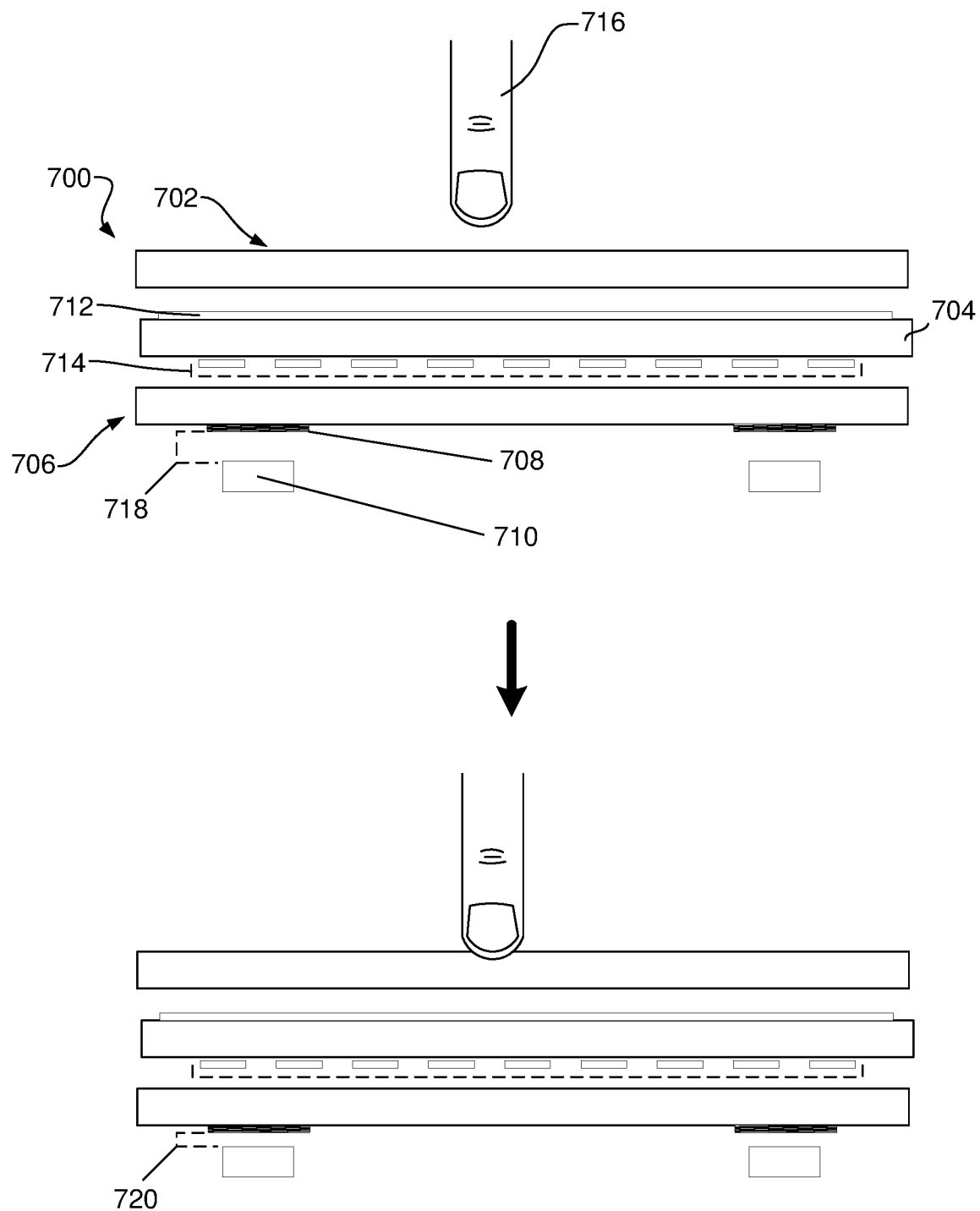
FIG. 7 depicts an example of detecting an applied pressure in accordance with the disclosure.

FIG. 7 depicts an example of a cross section of a capacitance module 700. A first substrate 704 may be located between a reference surface 702 and a second substrate 706. The first substrate 704 has a first side with a set of electrodes 712 and a second set of electrodes 714. The second substrate 706 has a first side and a second side. An inductance coil 708 may be disposed on the second side of the second substrate. A magnet 710 may be positioned adjacent to the inductance coil at a first distance 718. The object 716 may apply a force to the reference surface 702. The capacitance module 700 may move downward due to the applied force which moves the inductance coil 708 toward the magnet 710 until it arrives at a second distance 720 from the magnet.

In this example, the distance between the inductance coil 708 and the magnet 710 begins at the distance 718 and ends at the distance 720. In some examples, the movement of the inductance coil 708 may cause a change in the electrical characteristics of the inductance coil. This change may be related to the speed, distance, acceleration, or any other characteristic of the movement. For example, if the object pushes down on the reference surface 702 with a certain force, the capacitance module may accelerate downward at a certain speed. The speed at which the capacitance module accelerates may determine, at least in part, the change in the magnitude of the magnetic field interacting with the inductance coil.

In this example, the object 716 is a finger, but in other examples, the object may be a stylus, a palm, or any other appropriate object that may exert a force on the surface. In this example, the object applied a pressure input on the reference surface 702, but in other examples, the object may apply the pressure input to another surface of the capacitance module, an area around the reference surface, or any other area that may cause the capacitance module to be displaced. In this example, the substrates of the capacitance module are next to each other before the pressure input occurs, but in other examples, an air gap may be present between two or more of the substrates. In some cases, a pressure input on the reference surface 702 may displace the substrate on which the inductance coil 710 is disposed.

Figure 8:
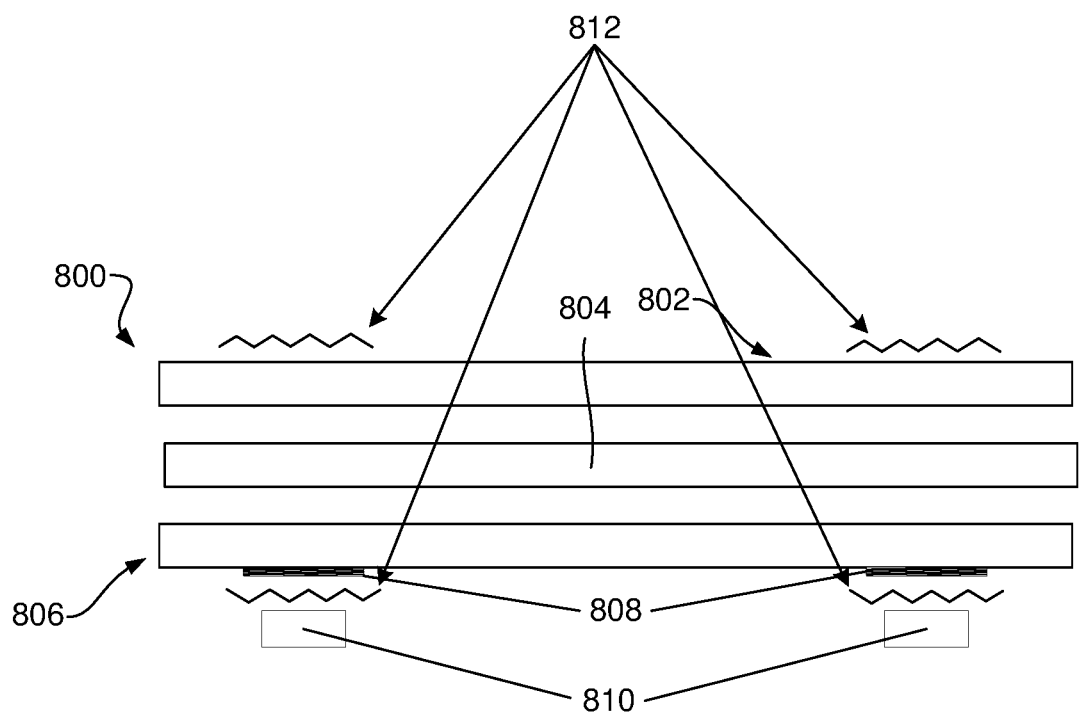
FIG. 8 depicts an example of providing a haptic response in accordance with the disclosure.

FIG. 8 depicts an example of a cross section of a capacitance module 800. A first substrate 804 may be positioned between a reference surface 802 and a second substrate 806. The substrate 804 may have electrodes that are a part of a capacitance circuit. A set of inductance coils 808 may be disposed on a side of the second substrate 806. A set of magnets 810 may be positioned so that they may interact with the set of inductance coils 808 to produce a haptic response 812.

In the depicted example, an electrical signal may be applied to the set of inductance coils 808 to produce the haptic response 812. In some examples, the set of magnets 810 may be fixed on a substrate not connected to the capacitance module 800. In other examples, the set of magnets may be fixed to a system that is mechanically attached to the capacitance module 800. In some examples, the haptic response 812 may be increased with an oscillating enhancement mechanism. In some examples, the oscillating enhancement mechanism may be connected to the set of magnets 810. In other examples, the oscillating enhancement mechanism may be connected to a component of the capacitance module 800.

In an example where an oscillating enhancement mechanism is used, an electrical signal may be applied to the set of inductance coils 808 that may cause the capacitance module 800 to oscillate at a certain frequency. In such an example, the certain frequency may be a frequency that causes the intensity of the oscillation to be larger than an oscillation at a different frequency. This frequency may be determined, at least in part, with the mass of a component, the combined mass of multiple components, the relative position of components, the elasticity of the oscillating enhancement mechanism, electromagnetic properties of one or more components or a combination thereof.

In some examples, the haptic response 812 may be a single oscillation of the capacitance module 800. In other examples, the haptic response may have multiple oscillations. In some examples, the haptic response 812 may have oscillations with different intensities, frequencies, durations, or a combination thereof. In some examples, the haptic response 812 may have oscillations separated by absences of oscillations.

Figure 9:
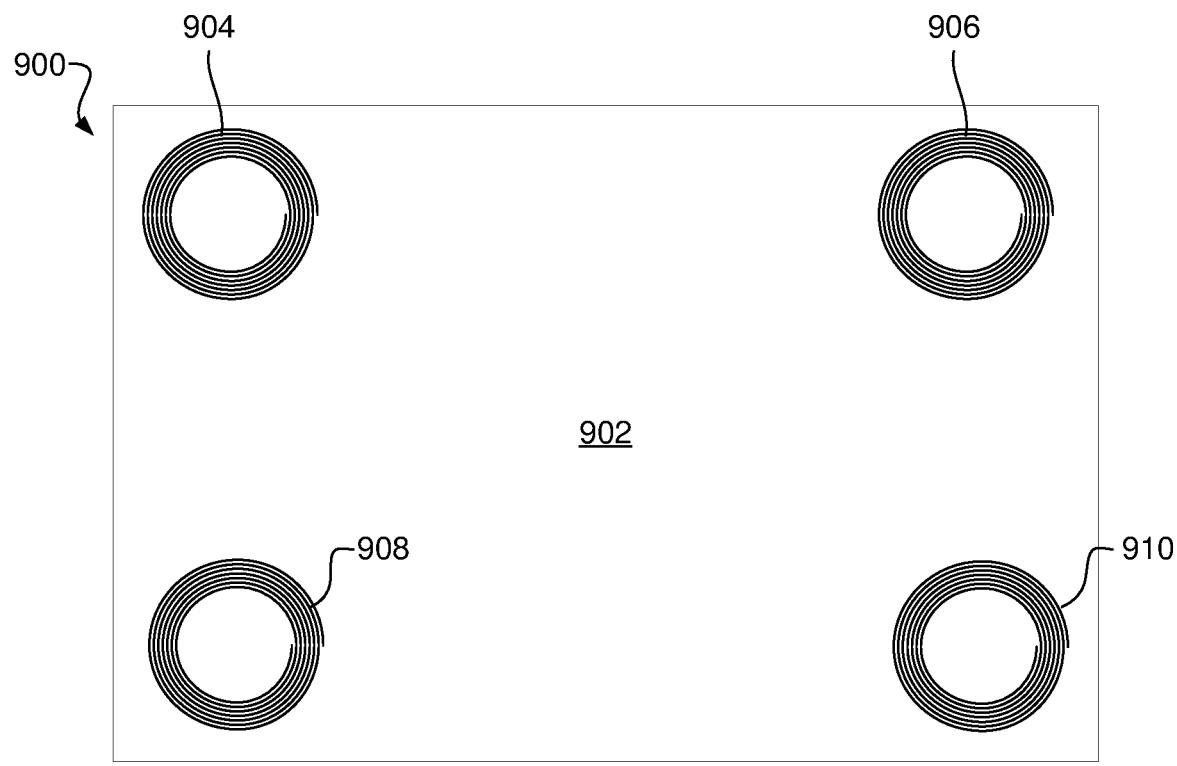
FIG. 9 depicts an example of an arrangement of inductance coils in accordance with the disclosure.

FIG. 9 depicts an example of a capacitance module 900. A substrate 902 has four corners. Inductance coils 904, 906, 908, 910 are deposited on the substrate 902. In this example, each of the four inductance coils is located in each of the four corners of the substrate 902. While this example depicts an inductance coil in each corner, any suitable number of inductance coils may be used and be placed in any suitable location on the substrate. For example, an inductance coil may be positioned in a centralized region of the substrate, a mid-region between corners of the substrate, a peripheral region of the substrate, another appropriate location, or combinations thereof.

Figure 10:
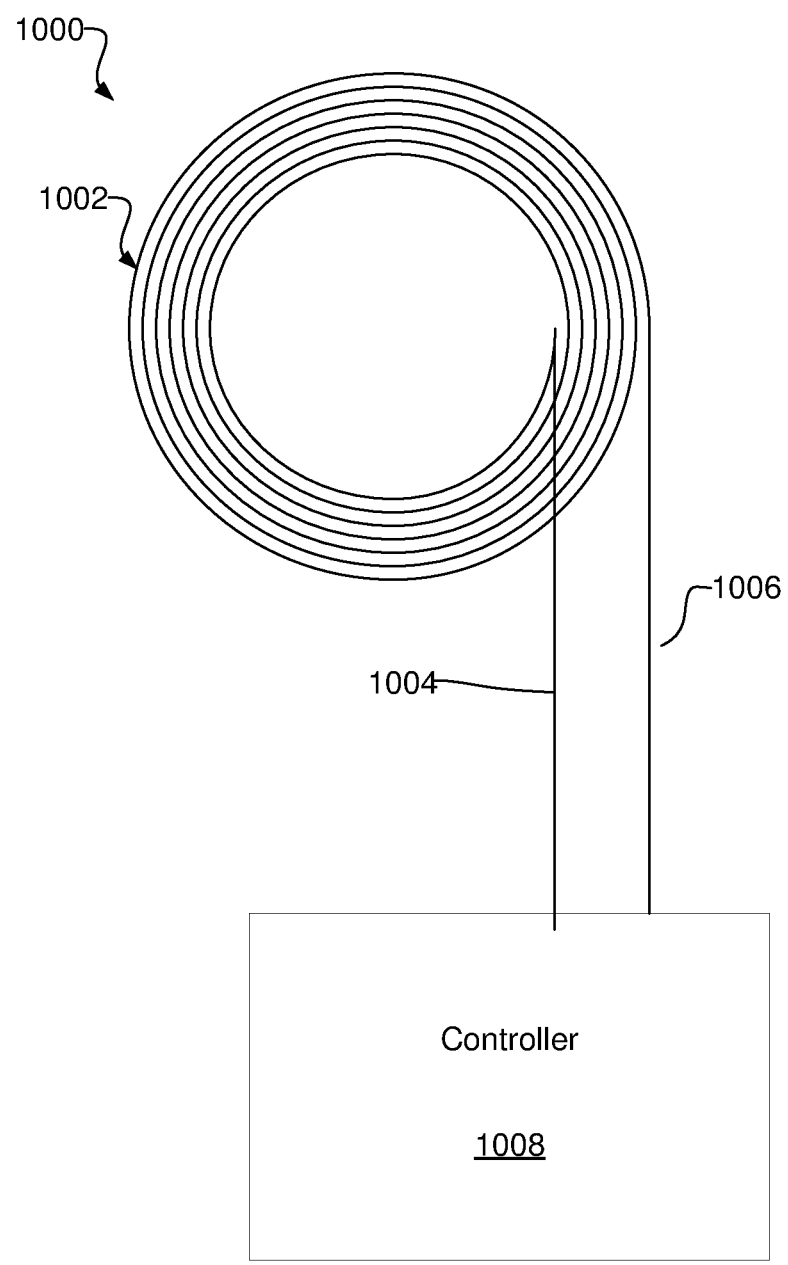
FIG. 10 depicts an example of an inductance coil and a controller in accordance with the disclosure.

FIG. 10 depicts an example of an inductance system 1000. An inductance coil 1002 is electrically connected to a controller 1008 by traces 1004, 1006. In some examples, the controller 1008 may apply an electrical signal to the inductance coil 1002. In some examples, the controller 1008 may apply a direct current (DC) signal to the inductance coil. In such an example, the applied signal may cause a magnetic field to be increased in a single direction, perpendicular to the plane on which the inductance coil is positioned. In other examples, the controller may apply an alternating (AC) signal to the inductance coil. In such an example, the AC signal may be applied at a certain frequency. In such an example, the applied signal may cause a magnetic field to be increased in a first direction and then in a second direction. The speed at which the direction of the magnetic field may be in relation to the frequency of the AC signal.

In the example depicted in FIG. 10, a first traces 1004 and a second trace 1006 connect the inductance coil 1002 to the controller 1008, but in other examples, three or more traces may connect the inductance coil to the controller. In such an example, a signal may be applied to multiple areas of the inductance coil simultaneously. In some examples, the inductance coil 1002 may have multiple portions deposited on multiple layers of substrate. In such an example, multiple portions may be connected to the controller 1008 and may have a signal applied to them. In any case, applying the signal to multiple portions of the inductance coil through multiple connections may increase the efficiency of the inductance coil compared to a single connection.

Figure 11:
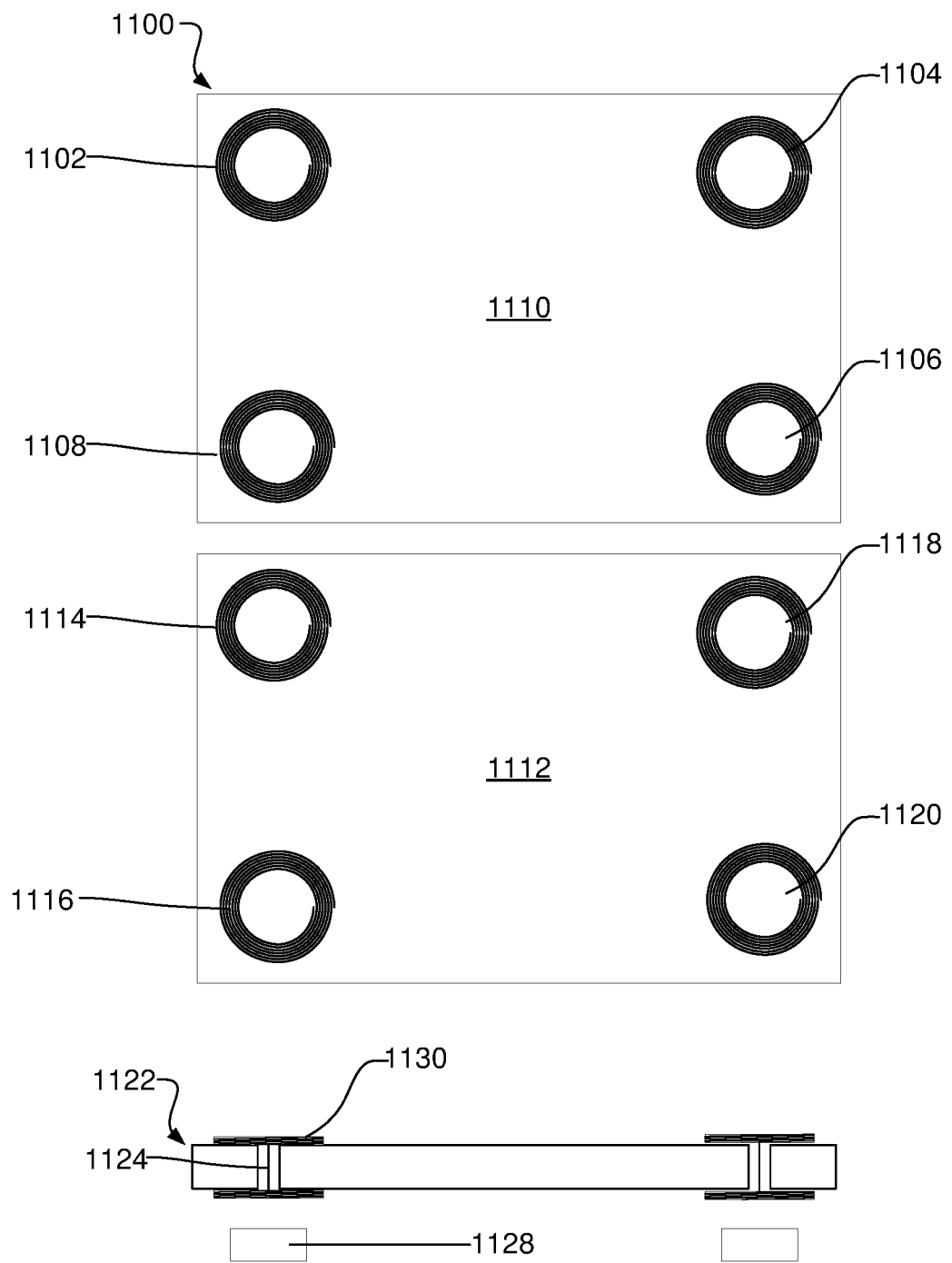
FIG. 11 depicts an example of an arrangement of multi-layer inductance coils in accordance with the disclosure.

FIG. 11 depicts an example of a capacitance module 1100. A substrate 1122 is positioned adjacent to a magnet 1128. A first surface 1110 of the substrate 1122 has portions of inductance coils 1102, 1104, 1106, 1108. A second surface 1112 of the substrate 1122 has portions of inductance coils 1114, 1116, 1118, 1120. A via 1124 electrically connects the portions 1108 and 1114 of inductance coil 1130. The inductance coil 1130 is positioned to interact with the magnet 1128.

In some examples, the via 1124 may pass through a substrate and/or dielectric materials between the substrates of the capacitance module 1100. In this example, the via 1124 connects two portions of the inductance coil 1130. In such an example, by connecting multiple portions of the inductance coil with the via 1124, the overall inductance coil may increase the size and/or number of coils in the inductance coil 1130. This may cause the change in the magnetic field caused by an electrical signal being applied to the inductance coil 1130 to be larger than a coil with only one of the portions on a single layer of the substrate. In some examples, this positioning of the inductance coil's traces or wires may cause the production of a magnetic field to be more efficient and/or the sensing of a nearby magnetic field to be more precise and/or accurate.

Figure 12:
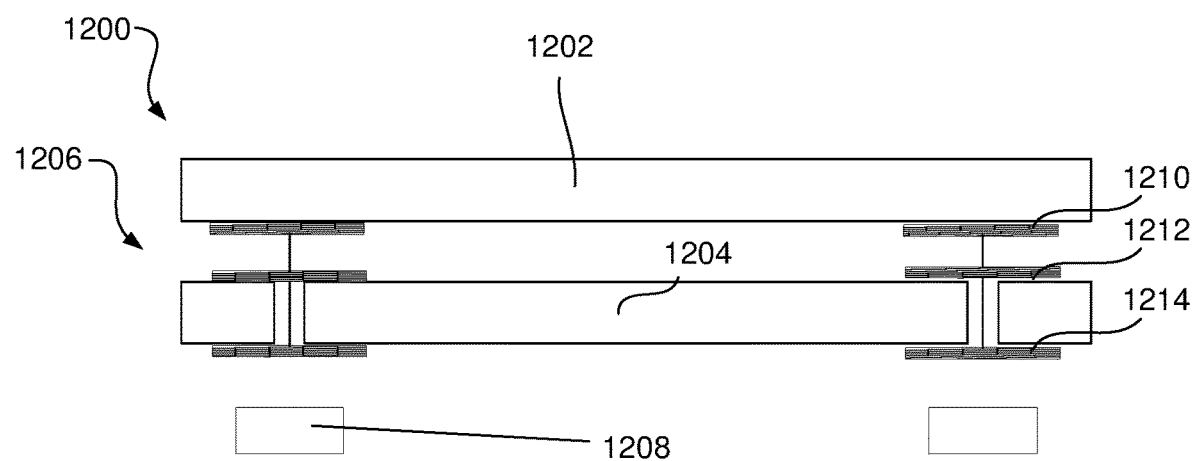
FIG. 12 depicts an example of an arrangement of multi-layer inductance coils in accordance with the disclosure.

FIG. 12 depicts an example of a capacitance module 1200. A first substrate 1202 has a first surface and a second surface and is positioned adjacent to a second substrate 1204 with a first surface and a second surface. An inductance coil 1206 is positioned to interact with a magnet 1208. The inductance coil 1206 has three portions 1210, 1212, 1214 that are connected electrically. A first portion 1210 of the inductance coil 1206 is deposited on the first surface of the second substrate 1204, A second portion 1212 of the inductance coil is deposited on the second surface of the second substrate 1204 and a third portion 1214 of the inductance coil is deposited on the second surface of the first substrate 1202.

In some examples, the portions of the inductance coils are connected in series. In other examples, the portions of the inductance coils are connected in parallel. In some examples, at least one of the portions is connected in series, and another of the portions is connected in parallel.

A first via 1220 may connect the first portion 1210 to the second portion 1212. In other examples, multiple vias may connect the first and second portions 1210, 1212. Further, a second via 1222 may connect the second portion 1212 to the third portion 1214. In other examples, multiple vias may connect the second and third portions 1212, 1214.

In some examples, one or more of the portions 1210, 1212, 1214 may be electrically connected to each other at multiple places. In such an example, the multiple connections may reduce the resistance of the overall inductance coil resulting in lower heat generation and improved electrical result with lower amounts of electrical energy applied. In some examples, the lower heat generation from the multiple connection points may assist in maintaining an overall lower temperature within the capacitance module resulting in improved life of the capacitance module's components. Further, the lower amounts of energy needed to operate the capacitance module may result in lower overall energy requirements to operate the capacitance module.

Figure 13:
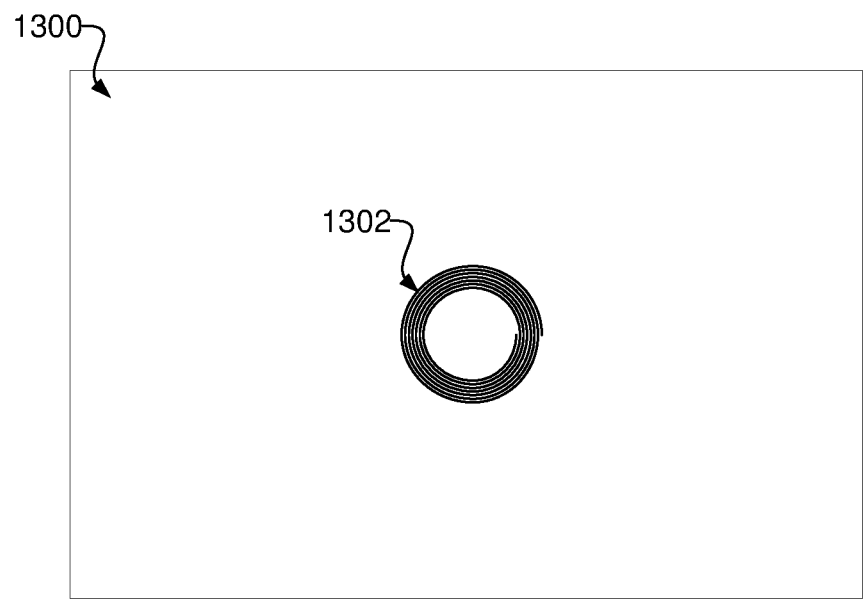
FIG. 13 depicts an example of an arrangement of inductance coils in accordance with the disclosure.
Figure 14:
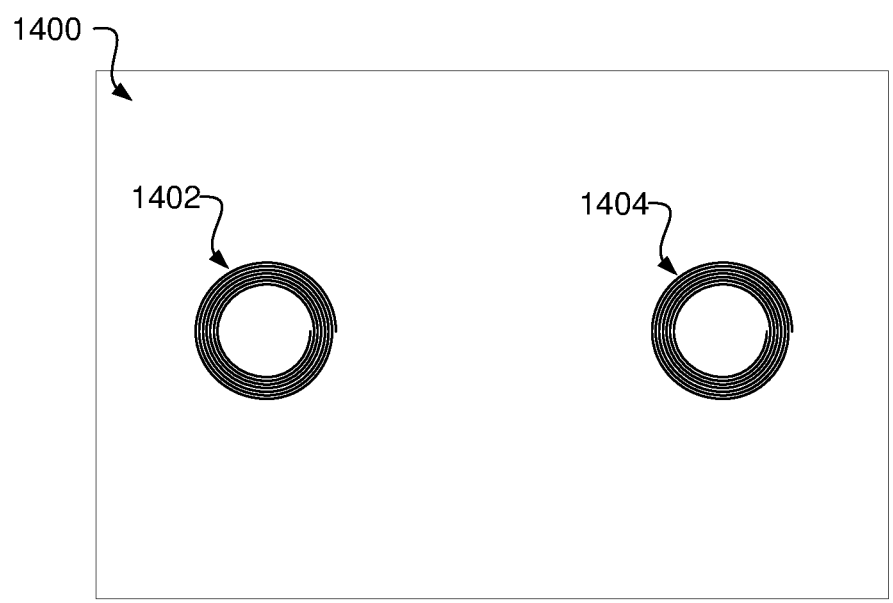
FIG. 14 depicts an example of an arrangement of inductance coils in accordance with the disclosure.

FIG. 13 depicts an example of a substrate 1300 with an inductance coil 1302 deposited in the center of surface of the substrate. FIG. 14 depicts an example of a substrate 1400 with a first inductance coil 1402 and a second inductance coil 1404. While FIG. 13 and FIG. 14 depict examples with a certain number of inductance coils at certain locations on the substrate, any appropriate number of inductance coils at any appropriate locations may be used. While the examples depicted above are described with reference to specific patterns and locations for the pressure sensors, other arrangements are contemplated including, but not limited to, symmetric distribution of coils, an asymmetric distribution of coils, other distributions and patterns of coils, or combinations thereof.

Figure 15:
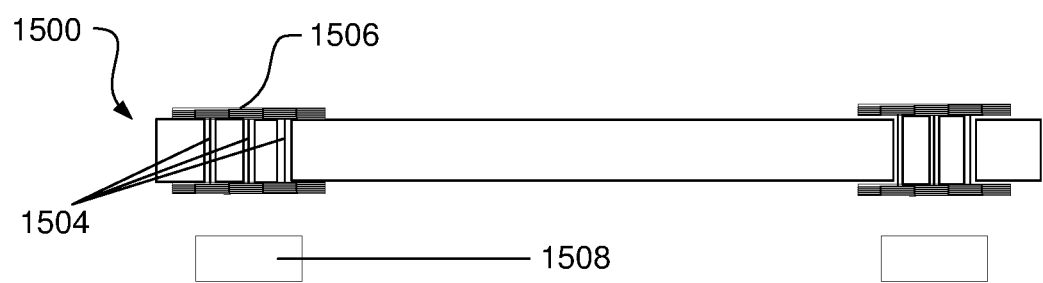
FIG. 15 depicts an example of connections between portions of an inductance coil in accordance with the disclosure.

FIG. 15 depicts an example of a substrate 1500 with a first side and a second side. An inductance coil 1506 has a first portion on the first side of the substrate 1500 and a second portion on the second side of the substrate. A set of vias 1504 connect the first portion of the inductance coil 1506 with the second portion of the inductance coil 1506. In some examples, the vias may connect the first and second portions at different parts. In some examples, a single via may connect the first portion of the inductance coil and the second portion of the inductance coil 1506. In other examples, the trace or wire of the inductance coil may have multiple connections between the first and second portions.

In the depicted example, the set of vias has three vias. The portions of the inductance coil 1506 may be deposited on the substrate flush and inward towards the center of the inductance coil. The inductance coil may be connected by a via to a portion on the other side of the substrate and continue spiraling towards the center. In the depicted example, the two portions may be deposited to have three connections between the two sides of the substrate. In some examples, the portions of the inductance coil on the first substrate and the portions of the inductance on the second substrate may not be aligned. While in the depicted example, the set of vias has three vias between the two portions of the inductance coil. In other examples, the set of vias may have one via or multiple vias, FIG. 16 depicts an example of an inductance coil 1600. A first portion 1602 and a second portion 1604 are connected by a via 1606. In some examples, the two portions of the inductance coil may produce a single magnetic field with an intensity greater than a single portion would produce if the first and second portions were not electrically connected. In some examples, the two portions of the inductance coil may produce a larger electrical signal when being acted on by a changing magnetic field than one portion otherwise would be.

FIG. 17 depicts an example of an inductance coil 1700. A first portion 1702 and a second portion 1704 are connected multiple vias 1706, 1708, 1710, 1712. In some examples, the vias may cause sections of the portions 1704 and 1702 to be connected so that they may produce less heat, be more efficient, and/or produce a larger inductive effect. While in this example four vias are used, in other examples, any appropriate number of vias may be used to connect any number of portions of an inductance coil. In some examples, these portions are deposited on several surfaces of several substrates of a capacitance module.

Figure 18:
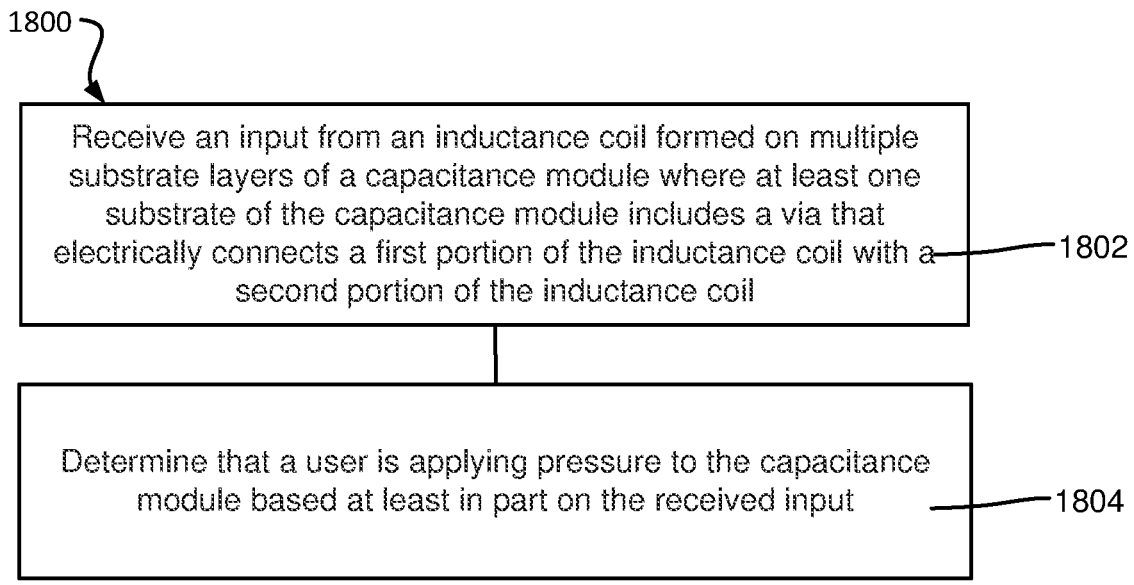
FIG. 18 depicts an example of a method of detecting an applied pressure in accordance with the disclosure.

FIG. 18 depicts an example of a method 1800 of detecting a pressure input. This method 1800 may be performed based on the description of the devices, modules, and principles described in relation to FIGS. 1-17 and FIGS. 20-22. In this example, the method 1800 includes receiving 1802 an input from an inductance coil formed on multiple substrate layers of a capacitance module where at least one substrate of the capacitance module includes a via that electrically connects a first portion of the inductance coil with a second portion of the inductance coil and determining 1804 that a user is applying pressure to the capacitance module based at least in part on the received input.

Figure 20:
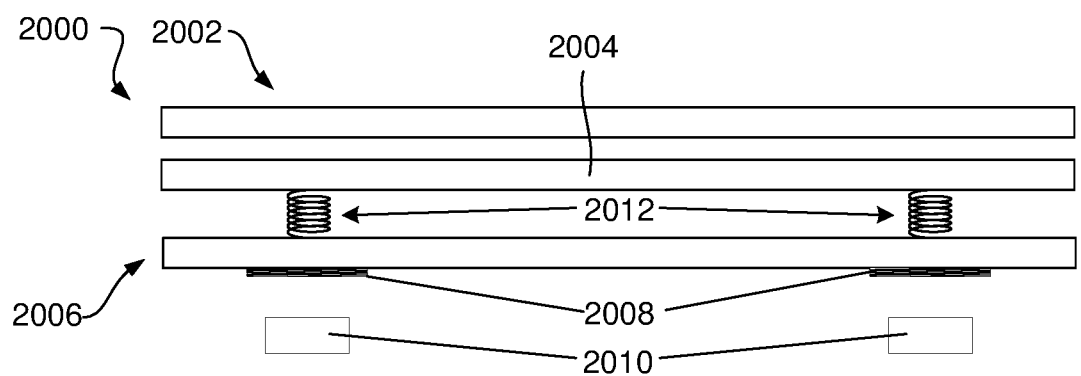
FIG. 20 depicts an example of a capacitance module with a set of magnets and springs in accordance with the disclosure.

FIG. 19 depicts an example of a method 1900 of providing a haptic response. This method 1900 may be performed based on the description of the devices, modules, and principles described in relation to FIGS. 1-17 and FIGS. 20-22. In this example, the method 1900 includes applying 1902 a signal to an inductance coil formed on multiple substrate layers of a capacitance module, where at least one substrate of the capacitance module includes a via that electrically connects a first portion of the inductance coil with a second portion of the inductance coil, such that the signal causes the inductance coil interact with a magnet positioned adjacent at least one of the substrates in a way that causes the capacitance module to vibrate FIG. 20 depicts an example of a capacitance module 2000. A first substrate 2004 is positioned between a reference surface 2002 and a spring 2012. A second substrate 2006 is positioned between the spring 2012 and a set of inductance coils 2008. A set of magnets 2010 are positioned to interact with the set of inductance coils 2008. In the depicted example, a haptic response provided by changing the magnetic field affecting the set of inductance coils may cause the set of inductance coils and second substrate 2006 to move in relation to the set of magnets 2010 and the first substrate 2004. In such an example, the spring may cause the force of the movement of the set of inductance coils and second substrate to cause the first substrate and the reference surface 2002 to also move and cause a haptic response.

In some examples, the spring may enhance the oscillation that causes the haptic response in the capacitance module 2000. In such an example, the mass of the capacitance module, the properties of the electrical signal provided to the inductance coil and the strength of the magnets may determine the properties of the oscillation enhancement mechanism used.

Figure 21:
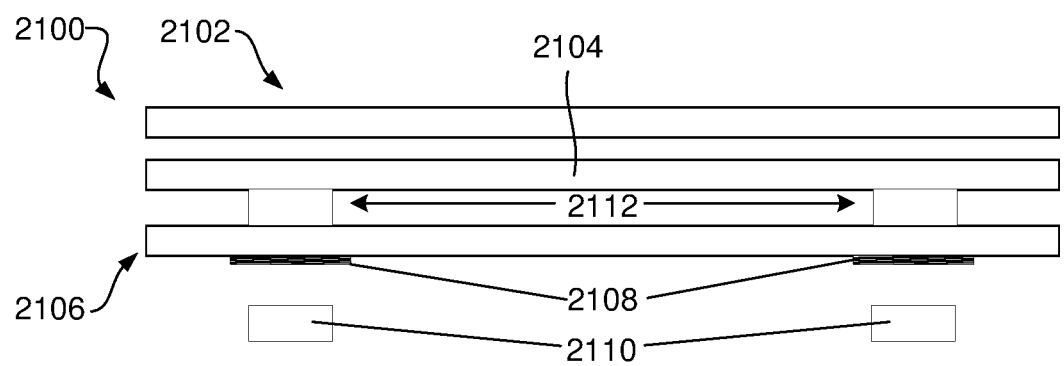
FIG. 21 depicts an example of a capacitance module with a set of magnets and foam pads in accordance with the disclosure.

FIG. 21 depicts an example of a capacitance module 2100. A set of foam pads 2112 is positioned between a first substrate 2104 and a second substrate 2106 to provide oscillation enhancement.

Figure 22:
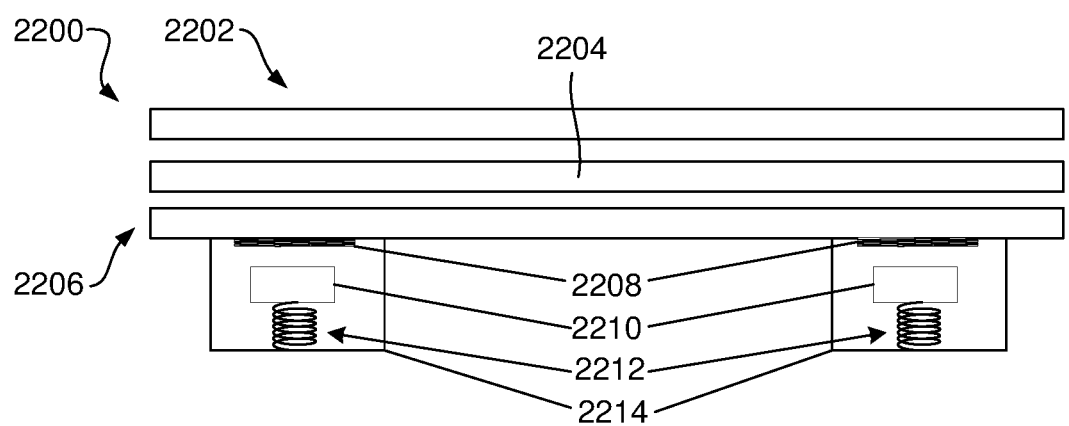
FIG. 22 depicts an example of a capacitance module with a set of magnets, springs and brackets in accordance with the disclosure.

FIG. 22 depicts an example of a capacitance module 2200. A set of magnets 2210 are fixed to a set of springs 2212. The set of springs 2212 are connected to a set of brackets 2214 which are attached to a substrate 2206. In this example, the set of springs 2212 and the set of brackets 2214 aid in oscillation enhancement, the inductance coil forms a spiral shape on the substrate. In some examples, the inductance coil may have a generally elliptical spiral shape, a generally circular spiral shape, a generally square spiral shape, a generally rectangular spiral shape, an asymmetric spiral shape, a spiral shape, a symmetric shape, an asymmetric shape, or combinations there.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skills in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
at least one touch electrode on a first surface of the capacitance module;
a first portion of an inductance coil deposited on a second surface of the capacitance module; and
the first portion of the inductance coil has a plurality of loops;
a second portion of the inductance coil deposited on a third surface of the capacitance module;
the second portion of the inductance coil has a plurality of loops; and
each of the plurality of loops of the first portion of the inductance coil is electrically connected to at least one of the plurality of loops of the second portion of the inductance coil;
wherein the inductance coil is positioned to interact with a magnet adjacent to the inductance coil.

2. The module of claim 1, wherein the magnet is configured to provide a haptic effect on the capacitance module by moving the inductance coil with a change in a magnetic force.

3. The module of claim 1, further comprising a controller and memory;
the memory having programmed instruction that, when executed, cause the controller to detect an applied force on the capacitance module by measuring a change in a distance between the inductance coil and the magnet.

4. The module of claim 1, wherein the first surface is on a first substrate;
the second surface is on a second substrate;
the third surface is also on the second substrate; and
a shield is located between the first surface and the second surface.

5. The module of claim 1, further comprising a controller and memory;
the memory having programmed instruction that, when executed, cause the controller to impose a varying signal on the inductance coil that interacts with the magnet to provide a haptic effect on the capacitance module.

6. The module of claim 1, further comprising a shield that is located between the at least one touch electrode and both the first portion of the inductance coil and the second portion of the inductance coil.

7. The module of claim 1, wherein the first portion of the inductance coil and the second portion of the inductance coil are electrically connected at multiple places within the first portion and the second portion.

8. The module of claim 1, wherein a third portion of the inductance coil is deposited on a fourth surface of the capacitance module.

9. The module of claim 1, wherein the first portion of the inductance coil and the second portion of the inductance coil are connected in series.

10. The module of claim 1, wherein the first portion of the inductance coil and the second portion of the inductance coil are connected in parallel.

11. The module of claim 1, wherein the first portion of the inductance coil is located near a corner of the second surface.

12. The module of claim 1, further comprising an oscillating enhancement mechanism connected to the capacitance module.

13. The module of claim 12, wherein the oscillating enhancement mechanism is foam, a spring, or combinations thereof.

14. A computer-program product for detecting a pressure input, the computer-program product comprising a non-transitory computer-readable medium storing instructions executable by a processor to:
receive an input from an inductance coil formed on multiple substrate layers of a capacitance module where the capacitance module has a surface having a plurality of corners, the inductance coil is part of a group of inductance coils, and at least one inductance coil from the group of inductance coils is located near each of the plurality of corners of the surface;

determine that a user is applying pressure to the capacitance module based at least in part on the received input;

wherein at least one substrate of the capacitance module includes a via that electrically connects a first portion of the inductance coil with a second portion of the inductance coil.

15. The computer-program product of claim 14, wherein the instructions are executable by the processor to:

determine a relative displacement of the capacitance module based at least in part on the received input.

16. The computer-program product of claim 14, wherein the received input represents a change in electrical current in the inductance coil.

17. The computer-program product of claim 14, wherein the instructions are executable by the processor to:

send a signal to a magnet proximate the inductance coil to cause at least one variation in a magnetic field of the magnet to interact with the inductance coil to cause the capacitance module to vibrate in response to determining that the user is applying the pressure to the capacitance module.

* * * * *